(12) United States Patent
Kang

(10) Patent No.: US 6,567,198 B1
(45) Date of Patent: May 20, 2003

(54) WAVELENGTH STABILIZER IN WDM OPTICAL TRANSMISSION SYSTEM

(75) Inventor: Yong-Hoon Kang, Kyonddi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/426,928

(22) Filed: Oct. 22, 1999

(30) Foreign Application Priority Data

Oct. 22, 1998 (KR) ............................................. 98-44296

(51) Int. Cl.[7] .......................... H04J 14/02; H04B 10/04; H04B 10/08
(52) U.S. Cl. ....................... 359/133; 359/180; 359/187; 359/110
(58) Field of Search ................................ 359/124, 180, 359/187, 110; 372/34, 133

(56) References Cited

U.S. PATENT DOCUMENTS

| | | | | |
|---|---|---|---|---|
| 5,469,288 A | * | 11/1995 | Onaka et al. ................ 359/124 |
| 5,812,296 A | * | 9/1998 | Tarusawa et al. ........... 359/145 |
| 5,920,414 A | * | 7/1999 | Miyachi et al. ............. 359/110 |
| 6,108,119 A | * | 8/2000 | Devenport et al. ......... 359/181 |
| 6,120,190 A | * | 9/2000 | Leard et al. ................... 372/32 |
| 6,295,147 B1 | * | 9/2001 | Yamane et al. ............. 359/110 |

* cited by examiner

Primary Examiner—Leslie Pascal
Assistant Examiner—David Payne
(74) Attorney, Agent, or Firm—Cha & Reiter

(57) ABSTRACT

There is provided a wavelength stabilizer for stabilizing the wavelength of an optical signal oscillated from a laser diode (LD) in each of a plurality of channel transmitters in a WDM (Wavelength Division Multiplex) optical transmission system. In the wavelength stabilizer, a temperature controlling circuit in each channel transmitter senses an LD operating temperature and maintains the LD at a reference temperature, a wavelength division multiplexer multiplexes the optical signals generated from the plurality of channel transmitters, a wavelength monitor is connected to the wavelength division multiplexer by an optical transmission line, monitors the wavelength deviation of an optical signal for each channel in the multiplexed signal, and outputs the wavelength deviation information, and a controller determines the wavelength deviation of each channel from the wavelength deviation information and updates the reference temperature of the temperature controlling circuit of each channel transmitter based on the deviation information.

4 Claims, 2 Drawing Sheets

WAVELENGTH STABILIZER IN WDM OPTICAL TRANSMISSION SYSTEM

CLAIM OF PRIORITY

This application makes reference to, incorporates the same herein, and claims all benefits accruing under 35 U.S.C. §119 arising from an application entitled, WAVELENGTH STABILIZER IN WDM OPTICAL TRANSMISSION SYSTEM, filed earlier in the Korean Industrial Property Office on Oct. 22, 1998, and there duly assigned Serial No. 1998-44296.

BACKGROUND OF THE INVENTION

1. Field of the Invention

The present invention relates to an optical transmission system using a wavelength division multiplex (WDM) scheme, and in particular, to a wavelength stabilizer for stabilizing the wavelength of an optical signal generated by a laser diode (LD) in each channel transmitter.

2. Description of the Related Art

WDM is one form of optical signal transmitting schemes, in which a plurality of optical signals at different wavelengths is simultaneously propagated through a strand of optical fiber. Multiplexing optical signals at different wavelengths on a strand of optical fiber is called wavelength division multiplexing, which is commonly identified by the acronym WDM, and the reverse operation is called "wavelength division demultiplexing."

In a WDM optical transmission system, a laser transmitter having an LD with a narrow spectrum as a light source is used as a channel transmitter, and channels are densely arranged in approximately 100 or 200 GHz intervals. The wavelength of an optical signal oscillated by such an LD should be within the range predetermined for a corresponding channel.

In the prior art, the wavelength of an optical signal within a predetermined range is stabilized based two different methods.

The first method utilizes the principle that the oscillation wavelength of an LD depends on an operating temperature. To stabilize the wavelength of an optical signal oscillated by the LD, the resistance of a thermistor sensor provided in the LD is compared with a reference value corresponding to a predetermined temperature, and an operating temperature is controlled according to the comparison result. A thermo-electric cooler (TEC) is typically used for the temperature control. This method is advantageous in that the control mechanism is simple, there is no need for additional parts to monitor wavelength deviation, and a high level of stability can be achieved. However, the LD deteriorates with time and thus the threshold current value increases with passage of time. Therefore, a driving circuit of the laser transmitter is made to maintain the optical output power constant by automatically controlling a bias current value. Despite the maintenance of a constant operating temperature, the wavelength of an oscillated optical signal gradually deviates when the LD is used for a long time, and it finally deviates from the predetermined range even with an accurate control of wavelength based on the predetermined temperature.

The second method requires the use of a separately procured wavelength stabilizing device for detecting the wavelength of an optical signal. The wavelength stabilizing device detects how much the wavelength of an optical signal deviates from a predetermined range and the temperature of an LD is controlled in real time. The wavelength stabilizing device may be used for each wavelength division multiplexed channel by extracting signals from a wavelength division multiplexed (WDM) optical signal. This method has the advantage of wavelength stabilization based on the accurate wavelength deviation information, but suffers from the constraint of obtaining the stability of a real time controlling circuit and also suffers from high cost due to the use of an expensive wavelength-stabilizing device for each channel.

As described above, the conventional wavelength stabilizing methods known in the prior art are not effective in stabilizing the wavelength of an optical signal in the long term, or have problems with the stability of a real time controlling circuit and cause high cost due to the requirement of a separately procured device.

SUMMARY OF THE INVENTION

Therefore, an objective of the present invention is to provide a wavelength stabilizer, which can simply and cheaply compensate for the deviation in the wavelength of an optical signal and ensure wavelength stability in the long term.

To achieve the above objective, this invention provides a single wavelength stabilizer that is operable to affect the LD in each of the plurality of channel transmitters in a WDM, in which a temperature controlling circuit in each channel transmitter senses an LD operating temperature and maintains the LD at a reference temperature, a wavelength monitor is connected to the wavelength division multiplexer by an optical transmission line for monitoring the wavelength deviation of an optical signal for each channel in the multiplexed signal, further outputs the monitored wavelength deviation information, and a controller determines the wavelength deviation of each channel from the wavelength deviation information and updates the reference temperature of the temperature controlling circuit of each channel transmitter in order to control the operating temperature of the LD.

BRIEF DESCRIPTION OF THE DRAWINGS

The above objective and advantages of the present invention will become more apparent by the following description of a preferred embodiment thereof with reference to the attached drawings in which.

A DETAILED DESCRIPTION OF THE PREFERRED EMBODIMENT

Figure 1:
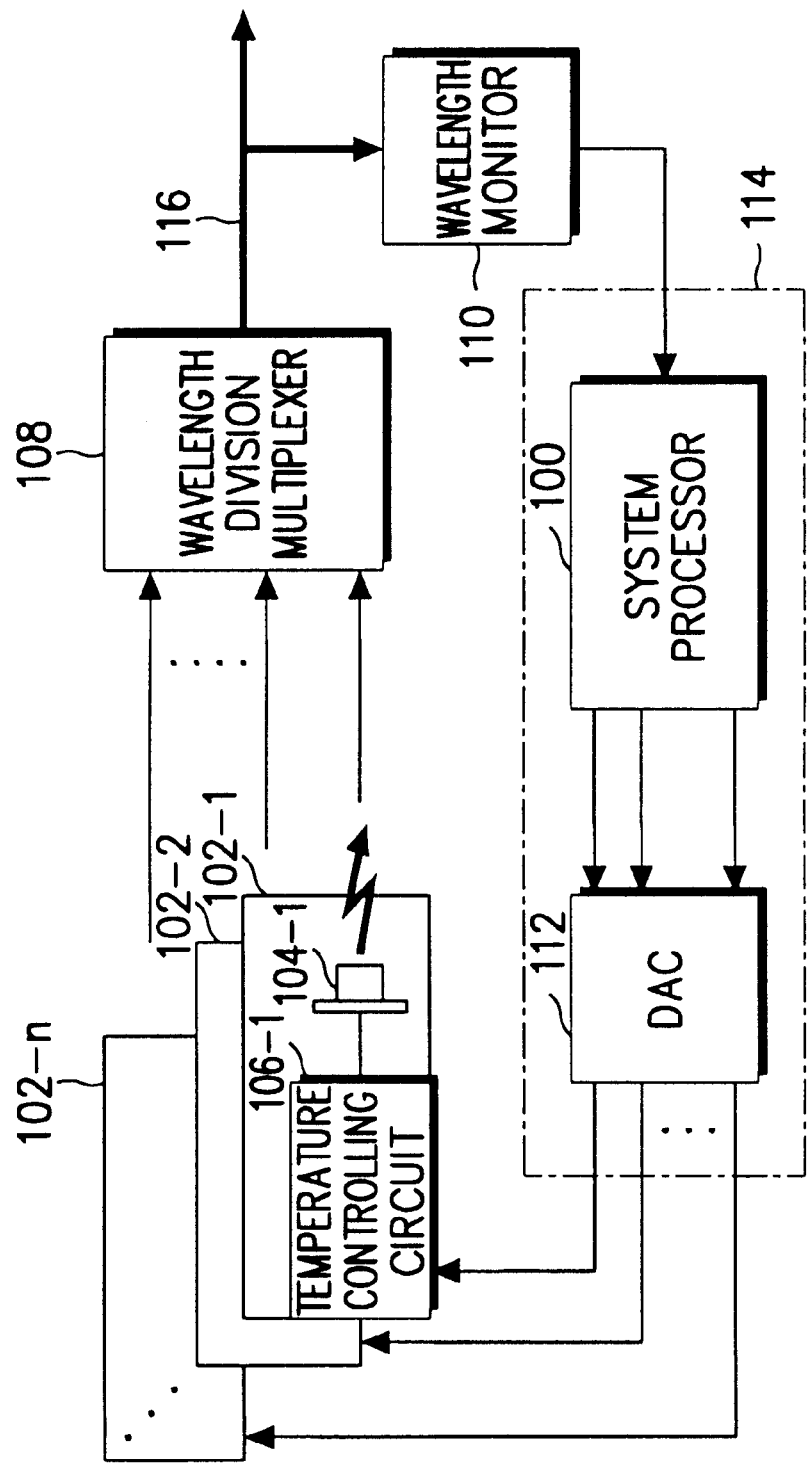
FIG. 1 is a block diagram of a transmitter including a wavelength stabilizer according to an embodiment of the present invention.

Referring to FIG. 1, an LD 104-1 in each of a plurality of channel transmitters 102-1 to 102-n generates a corresponding optical signal. The generated optical signal has a different wavelength depending on its assigned channel. For the purpose of clarity, only the LD 104-1 and a temperature controlling circuit of a channel transmitter of well-known design are illustrated. The optical signal for each channel, oscillated in each channel transmitter, 102-1 to 102-n, is fed to a wavelength division multiplexer 108. The wavelength division multiplexer 108 multiplexes the optical signals received from the channel transmitters 102-1 to 102-n. The multiplexed optical signal is generally transmitted through an optical transmission line 116 including a power amplifier, a line amplifier, a preamplifier, and the like of a well-known design (not shown).

Since the wavelengths of channels are closely arranged as described above, it is very important to maintain each channel at a predetermined specific wavelength in both the transmission and the reception sides. For this purpose, a wavelength monitor is used on each of the transmission and reception sides of a WDM optical transmission system. In FIG. 1, a wavelength monitor 10 is coupled to the optical transmission line 116 in the transmitter. The wavelength monitor 110 monitors the deviation of the wavelength of an optical signal for each channel in the multiplexed signal and outputs wavelength deviation information to a system processor 100 of a controller 114. Here, the wavelength deviation information refers to how much the wavelength of an optical signal in each channel deviates from a predetermined range. If the monitored wavelength of a channel is beyond the predetermined range, the deviation information is transmitted to the controller 114, so that a new reference temperature value for the temperature controlling circuit 106-1 can be obtained to compensate and to produce new optical signals in the predetermined range.

The controller 114 is comprised of the system processor 100 serving as a main controlling means to the transmitter 102-1 to 102-n and a DAC (Digital-to-Analog Converter) 112. The DAC 112 is coupled between the system processor 100 and the temperature controlling circuit 106-1 of each channel transmitter, for converting from digital value to analog value, the signal received from the system processor 100 to be used to set a new reference temperature value for the temperature controlling circuit 106-1. The new reference temperature is obtained based the deviation information and a look-up table, which contains corresponding reference temperature to compensate for the wavelength deviation so that a desired wavelength can be produced.

The temperature controlling circuit 106-1 senses the temperature of the LD 104-1 in a corresponding channel transmitter and maintains the LD 104-1 at the updated reference temperature in a periodic function. That is, the resistance of a thermistor sensor in the LD 104-1 is compared with the updated reference temperature received from the controller so that the operational temperature of the LD 104-1 is set to the updated reference temperature. Therefore, the wavelength of an optical signal generated by the LD 104-1 can be stabilized by updating the temperature controlling circuit 106-1 using the system processor 100 of the controller 114.

Figure 2:
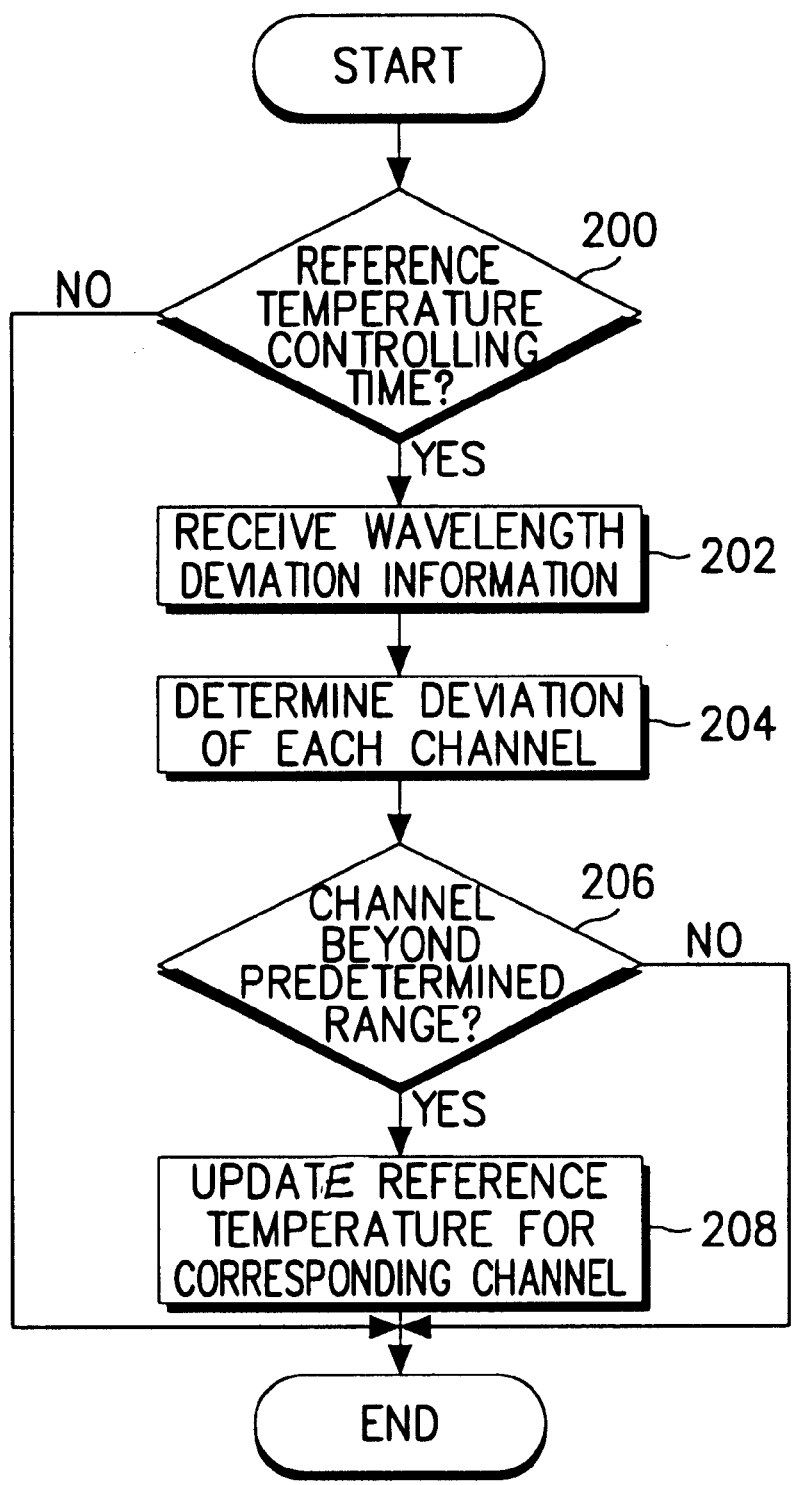
FIG. 2 is a flowchart of a controlling operation in the system processor shown in FIG. 1.

FIG. 2 is a flowchart of controlling a reference temperature to stabilize a wavelength at predetermined time interval in the system processor 100. The predetermined time interval can be set by an operator of the system. At step 200, the system processor 100 determines whether it is time to control the reference temperature of the temperature controlling circuit. If so, the system processor 100 receives the wavelength deviation information from the wavelength monitor 110, in step 202. The system processor 100 determines how much the wavelength of an optical signal for each channel deviates on the basis of the received wavelength deviation information, in step 204, and determines whether there is any channel with the wavelength deviation that is beyond a predetermined range, in step 206. If the wavelength of optical signals for all the channels is within the predetermined range, there is no need for controlling reference temperatures, and the procedure ends. On the other hand, if there is any channel with a wavelength deviation beyond the predetermined range, the system processor 100 sets the new reference temperature of the temperature controlling circuit in the corresponding channel transmitter so that the new reference temperature can compensate for the wavelength deviation, in step 208. That is, if the deviation degree exceeds the predetermined range, the reference temperature is changed.

Therefore, the long-term wavelength stability can be ensured by updating the reference temperature on the basis of the wavelength deviation information and compensation for the wavelength deviation, despite the deterioration of an LD 104-1 caused by long term usage. The wavelength deviation of an optical signal for each channel is monitored by a wavelength monitor without requiring a separately procured wavelength stabilizing device, resulting in simple and economical compensation for the wavelength deviation without imposing constraints on the stability of a real time controlling circuit. Since the wavelength deviation caused by a deteriorated LD 104-1 gradually proceeds over the long term, a reference temperature control should be periodically updated, taking the deterioration time into account. Then, even the absence of the wavelength deviation information from the wavelength monitor or other possible problems with a wavelength stabilization mechanism has no influence on wavelength stability within a predetermined time period.

While the present invention has been described in detail with reference to the specific embodiment, it is merely an exemplary application. Though a wavelength monitor is provided to a transmitter in the present invention, a wavelength monitor in a receiver may serve to monitor the wavelength deviation and send the wavelength deviation information to a controller of the transmitter. In such case, the wavelength deviation information is transmitted to the controller on a monitoring channel separately assigned by a WDM optical transmission system. In addition, the wavelength monitor can be provided inside or outside of a wavelength division multiplexer. Further, the reference temperature control can be updated periodically as well as continuously. Thus, it is to be clearly understood that many variations within the scope and spirit of the present invention can be made by anyone skilled in the art.

What is claimed is:

1. A wavelength stabilizer for stabilizing the wavelength of an optical signal generated from a laser diode (LD) in each of a plurality of channel transmitters in a WDM (Wavelength Division Multiplex) optical transmission system, comprising:

a temperature controlling circuit in each channel transmitter, for sensing an LD operating temperature and maintaining the LD at a reference temperature;

a wavelength division multiplexer for multiplexing optical signals generated by the plurality of channel transmitters;

a wavelength monitor connected to the wavelength division multiplexer by an optical transmission line, for monitoring the wavelength deviation of an optical signal for each channel in the multiplexed signal and outputting wavelength deviation information; and a controller coupled to the wavelength monitor for determining the wavelength deviation of each channel from the wavelength deviation information and updating the reference temperature of the temperature controlling circuit of each channel transmitter based on the wavelength deviation information;

wherein the controller updates the reference temperature by a predetermined value to compensate for the wavelength deviation.

2. The wavelength stabilizer of claim 1, wherein the controller updates the reference temperature when the wavelength deviation is beyond a predetermined range.

3. The wavelength stabilizer of claim 2, wherein the controller updates the reference temperature periodically.

4. The wavelength stabilizer of claim 1, wherein the wavelength monitor is provided on a transmitting side of the WDM system.

* * * * *